UNITED STATES PATENT OFFICE.

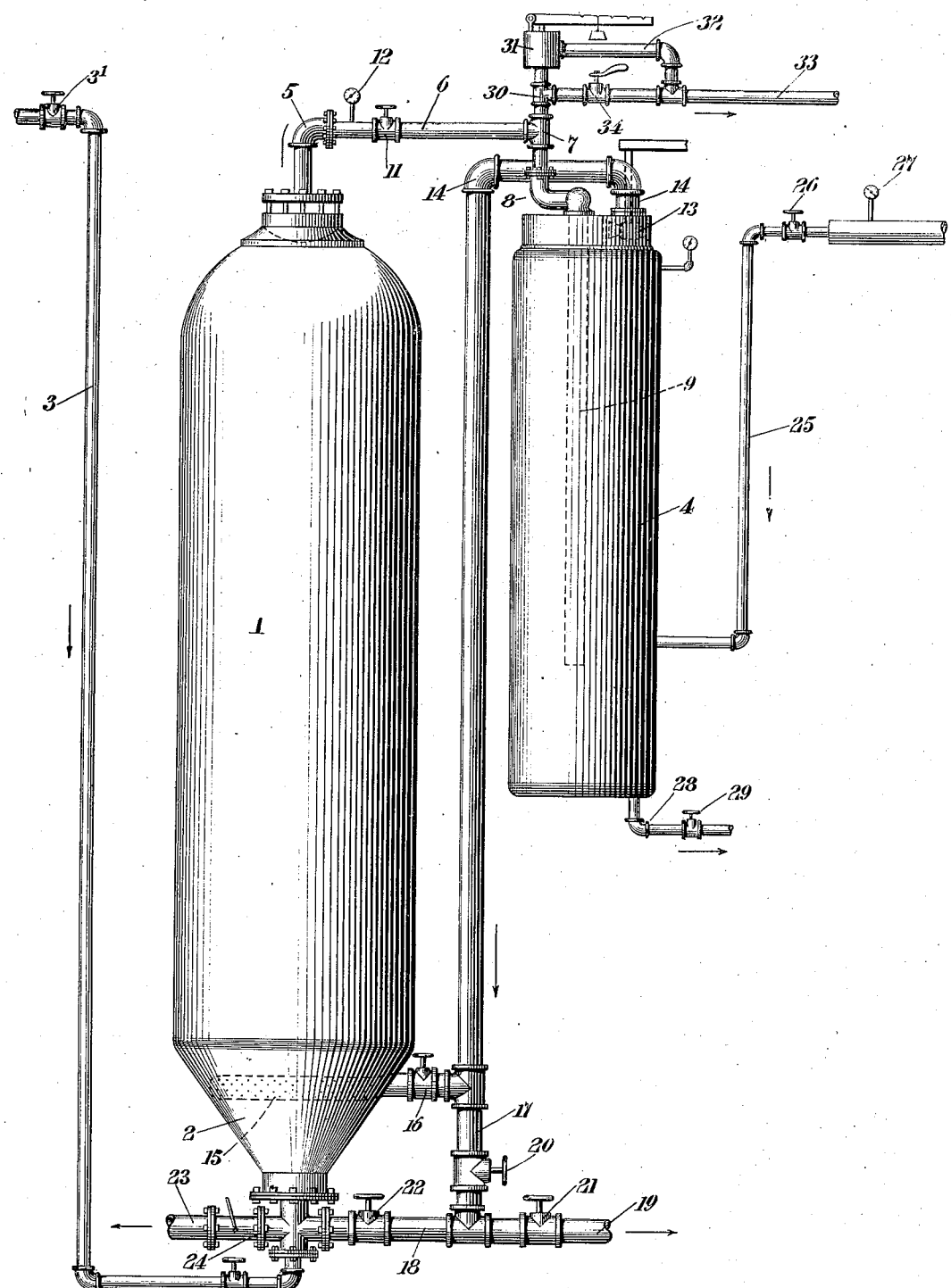

JOHN D. TOMPKINS, OF VALATIE, NEW YORK.

DIGESTER AND PROCESS OF COOKING FIBROUS MATERIAL.

1,167,030.　　　　　Specification of Letters Patent.　　　Patented Jan. 4, 1916.

Application filed September 16, 1913.　Serial No. 789,981.

*To all whom it may concern:*

Be it known that I, JOHN D. TOMPKINS, of Valatie, in the county of Columbia, and in the State of New York, have invented a certain new and useful Improvement in Digesters and Processes of Cooking Fibrous Material, and do hereby declare that the following is a full, clear, and exact description thereof.

The object of my invention has been to provide a digester and process of cooking fibrous material whereby the quality of the fiber produced and the uniformity of its condition may be improved, and whereby the cost of cooking may be reduced. And to such ends my invention consists in a digester and process of cooking fibrous material hereinafter specified.

In the accompanying drawings the figure is an elevation of a digester embodying my invention.

I have illustrated my invention by that embodiment which is the best embodiment thereof known to me, but such embodiment is to be regarded as typical only of many possible embodiments, and my invention, both as to the form of the apparatus and the method of cooking, is not to be confined thereto.

In the illustrated apparatus, a digester 1 is provided which may be of the usual form, and which, as illustrated, has the usual cone-shaped bottom 2. A live steam pipe 3, enters the digester at the bottom, such pipe being preferably provided with cocks 3' and 3² for controlling said pipe.

I desire to provide means for precipitation or condensation of water from the steam taken from the top of the digester and means for superheating the dry steam thus formed, and in the illustrated embodiment, I have provided for accomplishing both of such objects by means of a single chamber 4, which I shall term the condensing and superheating chamber. A pipe 5 leads from the top of the digester by a pipe 6 to a T 7 and by a pipe 8 to a pipe 9, extending down toward the lower end of the chamber 4. The entrance into the pipe 5 within the digester is protected by a screen of any desired construction, and the pipe 6 is provided with a valve 11 for controlling the flow and with a pressure gage 12. A steam and hot air pump 13 is mounted on or connected to the upper portion of the chamber 4, by its suction, and its delivery pipe 14 extends to the lower portion of the digester, and is connected with an annular perforated pipe 15, within the digester and controlled by a valve 16. The pipe 14 is preferably also connected by pipes 17 and 18, with the bottom of the digester. A pipe 19 may be connected with the pipe 18 for admitting dry steam to another digester, and valves 16, 20 and 21 may be provided to control pipes 17 and 19 respectively. A valve 22 may be provided to control the pipe 18. A blow-off pipe 23 controlled by a valve 24, is also provided for blowing off the cooked fiber.

The chamber 4 is provided with live steam for heating its contents to render the heat therein dry, by a pipe 25 having a valve 26 and a gage 27. The lower end of the chamber 4 is provided with a pipe 28 for the escape of condensed water by steam trap not shown; such pipe is controlled by the valve 29.

A relief pipe 30 is connected with the T 7 and provided with an automatic relief valve 31 of any desired description. The escape of the valve 31 is preferably through a pipe 32 to a pipe 33, the latter being also connected with the pipe 30 or with the T 7 to short circuit or shunt the relief valve 31, the pipe 33 being provided with a manually controllable relief valve 34.

In the use of the above described apparatus and the practice of my said process, the digester is charged with the raw material to be cooked, the pump 13 is started and live steam is preferably admitted through the pipes 25, 14 and 3 to the bottom of the digester; and mixes with the treating liquor and fiber, and constantly rises through the liquor and causes the fiber to remain suspended in the liquor so as to be advantageously cooked. The pump draws off the steam and gases from the top of the digester chamber, the pump drawing from the top of the chamber 4 so that the steam and gases pass through the pipes 5, 6, 7, 8 and 9, to the lower part of the chamber 4, where the water carried by the steam, or a portion thereof, is deposited in the chamber and the dry steam rises through the upper portion of the chamber 4, where it is heated under the action of live steam entering through the pipe 25. The pump 13 takes the dry steam and, forcing it through the pipes 14 and 16 causes it again to enter the digester through the perforated pipe 15, at or near its bottom. The steam then rises through the cooking liquor and helps to heat said liquor and keep the fiber in suspension as before described. I preferably continue this action until the temperature in the digester reaches the desired height and the pressure rises sufficiently to require relief through the valve 31. At this period I preferably close the pipe 3, which admits live steam to the digester, and adjust the openings through the relief valve 34 so that the excess of gas and steam generated, may be allowed to escape, and then so speed the pump 13 that thereafter substantially both uniform temperature and pressure be maintained within the digester until the cooking is completed. The water of condensation is allowed to escape through the pipe 28 and the valve 29.

It will be observed that my invention provides for a constant and positive circulation of steam or other heat carrying medium through the digester; so that its heat is most efficiently communicated to the cooking liquor, and so that a sure upward circulation thereof is provided to maintain a uniform temperature and to keep the fiber in suspension, within the digester. It will also be observed that the water of condensation which is carried over into the chamber 4, is prevented from diluting the cooking liquor, so that the latter is, to that extent, prevented from losing its original strength. As the automatic valve 31 provides the release of excess of pressure, and as the pump provides a positive circulation, neither the excess nor the deficiency of pressure can, within limits interfere with the cooking. This is very important, since otherwise, cooking will cease, the fiber will settle and pack in the bottom of the digester, and it is difficult to restore it to its prior condition of uniform suspension.

The action in my apparatus being most efficient, reduces the amount of heat required.

I claim:—

1. The combination of a digester, a closed vapor circulating system, and means for positively effecting a circulation of vapors therein.

2. The combination of a digester, a closed vapor circulating system leaving the top of the digester and entering the bottom thereof, and means for causing a positive circulation of vapors therein.

3. The combination with a digester of a closed vapor circulating system leaving the top of the digester above the level of the cooking liquor, and entering the bottom of the digester, and means for producing a positive circulation of vapors therein.

4. The combination with a digester, a closed vapor circulating system leaving the top of the digester and entering the bottom thereof, means for causing a positive circulation of vapors therein, and means for heating vapors while passing through said system.

5. The combination with a digester, a closed vapor circulating system leaving the top of the digester and entering the bottom thereof, means for causing a positive circulation of vapors therein, and means for heating vapors while passing through said system, and means for removing water from said vapors while passing through said system.

6. The combination of a digester, means for separating water from vapor, piping connecting the top of the digester with said means, means for heating the dried vapor, and piping connecting said last mentioned means with the bottom of the digester.

7. The combination of a digester, means for separating water from vapor, piping connecting the top of the digester with said means, means for heating the dried vapor, piping connecting said last mentioned means with the bottom of the digester, and means for causing steam to circulate through said system.

8. The combination of a digester, a chamber having heating means in its upper portion, piping connecting the top of said digester with the lower portion of said chamber, and a pump connected with the upper portion of said chamber and the bottom of said digester.

9. The combination of a digester, heating means, piping connecting the top of said digester with said heating means, piping connecting said heating means with the lower portion of the digester, a perforated pipe in said portion of the digester with which said pipe is connected, and a pump for causing the circulation through said system.

10. The combination of a digester, vapor circulating system leaving the top of said digester and entering the bottom thereof, means for causing a circulation of vapors therethrough, and a relief pipe connecting with said system.

11. The combination of a digester, vapor circulating system, leaving the top of said digester and entering the bottom thereof, means for effecting the circulation of vapors in said system, and a manually controllable relief valve also connected with said system.

12. The combination of a digester, a closed vapor circulating system leaving the extreme top of the digester and entering the bottom thereof, and means for causing a positive circulation of vapors therein.

13. The combination of a digester, a closed vapor circulating system leaving the extreme top of the digester, having a pump therein and entering the bottom of the digester.

14. The combination of a digester, a closed vapor circulating system leaving the extreme top of the digester and entering the bottom thereof, means for causing a positive circulation of vapors therein, and means for heating the vapors while passing through said system.

15. The combination of a digester, a closed vapor circulating system leaving the extreme top of the digester, having a pump therein and entering the bottom of the digester, and means for heating the vapors while passing through said system.

16. A process of digesting fibrous material which consists in introducing it into a closed chamber, exhausting the steam from the top of said chamber, and introducing it into the bottom of such chamber continuously.

17. A process of digesting fibrous material consisting in introducing it into a closed chamber removing the steam from the top of said chamber, drying said steam and introducing it into the bottom thereof.

18. A process of digesting fibrous material consisting in introducing it into a closed chamber removing the steam from the top of said chamber, drying and heating said steam, and reintroducing it into the bottom of said chamber.

In testimony that I claim the foregoing I have hereunto set my hand

JOHN D. TOMPKINS.

Witnesses:
EMMA A. TOMPKINS,
H. C. NORTH.